United States Patent [19]
Church

[11] 3,787,806
[45] Jan. 22, 1974

[54] TIRE PRESSURE WARNING APPARATUS
[75] Inventor: Donald E. Church, Richmond, Ind.
[73] Assignee: Avco Corporation, Richmond, Ind.
[22] Filed: June 26, 1972
[21] Appl. No.: 266,113

[52] U.S. Cl. ............... 340/58, 200/61.22, 116/34 R, 73/146.3, 73/146.5
[51] Int. Cl. ............................................. B60c 23/04
[58] Field of Search ............... 340/58, 60, 237, 239; 200/61.22, 61.23, 61.25, 61.26; 116/34 R, 70; 73/146.2, 146.3, 146.5

[56] References Cited
UNITED STATES PATENTS
| | | | |
|---|---|---|---|
| 2,966,658 | 12/1960 | O'Neill | 340/58 |
| 3,281,784 | 10/1966 | Farthing | 340/58 |
| 3,533,063 | 10/1970 | Garcia | 340/58 |
| 3,593,269 | 7/1971 | Richardson | 340/58 |

*Primary Examiner*—Donald J. Yusko
*Assistant Examiner*—Joseph E. Nowicki
*Attorney, Agent, or Firm*—Charles M. Hogan; Eugene C. Goodale

[57] ABSTRACT

A tire pressure warning apparatus for operation in a pneumatic tire in combination with an inner tube is disclosed. The warning apparatus comprises a pressure sensor, transmitter and a source of power sealingly adhered to an inner tube. The sensor assembly being in communication with the tire pressure for actuation of the transmitter in response to a drop in the tire pressure. Means are provided to protect the individual components while permitting the necessary flexibility to conform to the shape and motion of the inner surface of the tire.

4 Claims, 6 Drawing Figures

PATENTED JAN 22 1974

TIRE PRESSURE WARNING APPARATUS

BACKGROUND OF THE INVENTION

The present invention relates generally to pressure apparatus and more particularly to a tire pressure warning apparatus used in combination with an inner tube to provide warning of lowered pressures in tires requiring inner tubes.

Safe, efficient and economical transportation depends to a significant degree on maintaining the correct pneumatic pressure in all tires of a motor vehicle. Failure to correct quickly a faulty air pressure may result in excessive tire wear, blow-outs, low gasoline mileage and steering difficulties. Numerous tire warning systems are known in the art. Representative examples of such excesses may be found in U.S. Pat. Nos. 2,727,221 to Sprigg; 2,966,658 to O'Neill; and 3,533,063 to Garcia. Truck tires differ from those used on personal cars in that inner tubes are generally used. While the prior art pressure warning systems can be utilized with tires utilizing inner tubes, quite often significant expenses are involved to modify the tires to incorporate the prior art systems. As an example, the sensor may be incorporated in the valve stem as is shown in Garcia and Sprigg. Often, substantial expense is required in providing the necessary modifications. To date, there is no tire pressure warning apparatus incorporated with an inner tube for use in such systems.

Accordingly, it is an object of this invention to provide a tire pressure warning apparatus in combination with an inner tube for use in a system to provide indications of low tire pressure.

A further object of this invention is to provide a tire pressure warning apparatus having a configuration designed to be adhered to an inner tube, the combination apparatus and inner tube fitting the inside of the tire.

A further object of this invention is to provide a pressure warning apparatus in combination with an inner tube having means for replacement of the power supply.

A still further object of this invention is to provide a sectionalized tire pressure warning apparatus having sufficient flexibility to withstand the rough treatment inadvertently given tires.

And yet another object of this invention is to provide a sectionalized tire pressure warning apparatus having flexibility means between the sections.

SUMMARY OF THE INVENTION

This invention provides a tire pressure warning apparatus in combination with an inner tube for use in a vehicle tire pressure warning system. The pressure warning apparatus comprises a semi-flexible unit adhered to the inner tube. The unit embodies a pressure sensor in communication with the tire pressure, a transmitter, and a source of power. The three elements are incorporated in an elastic material to provide a flexible connection between each section to accommodate for the flexing and distortion of the tire.

Other objects, details, uses and advantages of this invention will be apparent as the following description of the exemplary embodiments thereof presented in the accompanying drawings proceeds.

BRIEF DESCRIPTION OF THE DRAWINGS

The accompanying drawings show present exemplary embodiments of this invention in which.

DESCRIPTION OF ILLUSTRATED EMBODIMENTS

Figure 1:
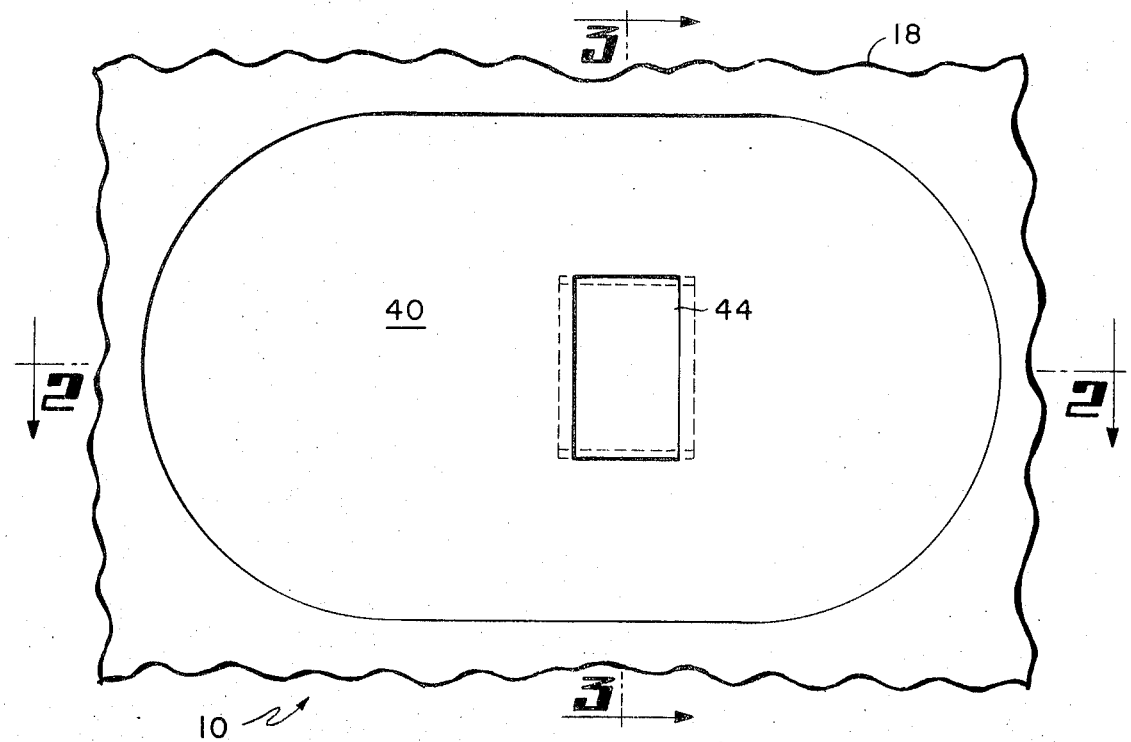
FIG. 1 is a fragmentary top view of an inner tube with the warning apparatus secured thereto.
Figure 2:
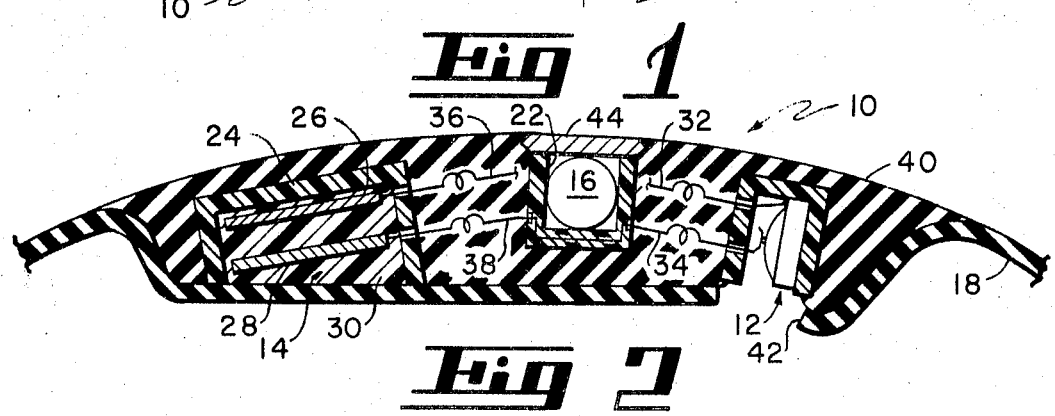
FIG. 2 is a sectional view taken on the line 2—2 of FIG. 1.
Figure 3:
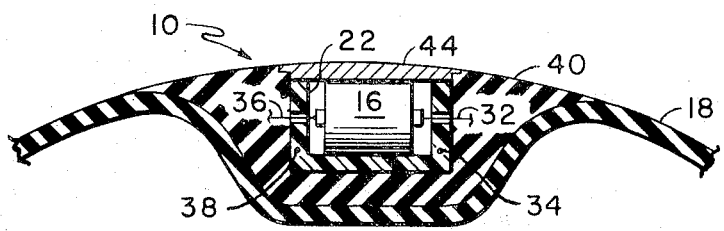
FIG. 3 is a sectional view taken along the line 3—3 of FIG. 1.

Reference is now made to FIGS. 1-3 of the drawings, which illustrate one exemplary embodiment of the tire pressure warning apparatus of this invention, which is designated generally by the reference numeral 10. The warning apparatus 10 comprises a pressure sensor 12, a transmitter 14 and a power supply 16 all secured to an inner tube 18 in a manner to be described herebelow.

The sensor 12 is housed in a hard inflexible enclosure 20 such as a hard plastic box. The sensor 12 may be any suitable pressure sensing device which provides a switch on/off action in response to pressure fluctuation outside a predetermined range. An example of such a sensor is described in a co-pending U. S. Pat. application of Brobeck and Lane, Ser. No. 237,386, filed Mar. 3, 1972, now U.S. Pat. No. 3,743,801 and owned by the assignee of the present invention.

The source of power 16 may be any suitable battery, such as a mercury battery. The battery 16 is housed in a suitable inflexible enclosure 22 such as a hard plastic box or the like.

The transmitter 14 is housed in an inflexible enclosure 24 such as a hard plastic box or the like. Any suitable transmitter which will generate an RF signal may be used. An example of a suitable transmitter is a self-pulsed, squegging Clapp oscillator 26 and a transmitting antenna 28. The oscillator 26 and antenna 28 are secured in the housing 24 by any suitable potting material 30.

Appropriate leads 32 and 34 connect the sensor 12 with the battery enclosure 22 and leads 36, 38 connect the battery enclosure 22 with the transmitter 14. The leads 32, 34, 36 and 38 are formed using stranded wire. In addition, the wires are coiled to permit flexing of the apparatus 10 without incurring wire breakage. The sectionalized apparatus 10, i.e., sensor 12, power supply 16, and transmitter 14 are encased in any suitable elastic material 40, such as natural rubber or the like, to provide a flexibility comparable to that of the inner tube 18. The semi-flexible warning apparatus 10 can be vulcanized, or otherwise adhered (hermetically sealed) to the top or crown of the inner tube 18. The lead wires are molded in place in an area of minimum flexing. In the present embodiment, the inner tube 18 is provided with an aperture 42 therethrough to provide communication between the sensor 12 and the internal tire pressure. To permit battery replacement, any suitable insert 44 is secured in the elastic material 40. The insert 44 is removable and cooperates with the enclosure 22 to permit entry to the enclosure 22. The enclosures 20, 22 and 24 are provided with appropriate terminals for connecting the respective leads with the component elements.

The operation of the sensor 12 is fully described in the aforementioned application. It being sufficient herein to mention that the sensor 12 incorporates a sealed pressurized dome which dimples when it is exposed to a pressure greater than a preselected minimum. The dimple provides a normally open snap switch which closes whenever the pneumatic pressure falls below a value somewhat less than the pressure required to open the switch. The operation of the snap switch by the sensor 12 completes the transmitter 14 circuitry. The battery powered transmitter 14 generates an RF signal which is picked up by any suitable receiver antenna mounted adjacent to the vehicle wheel. Any suitable communication link with the receiving antenna will process the signal received from the transmitter 14 to a suitable indicator generally mounted within the cab of the vehicle wherein the indicator will communicate warning of low pressure in a tire to the operator of the motor vehicle.

Figure 4:
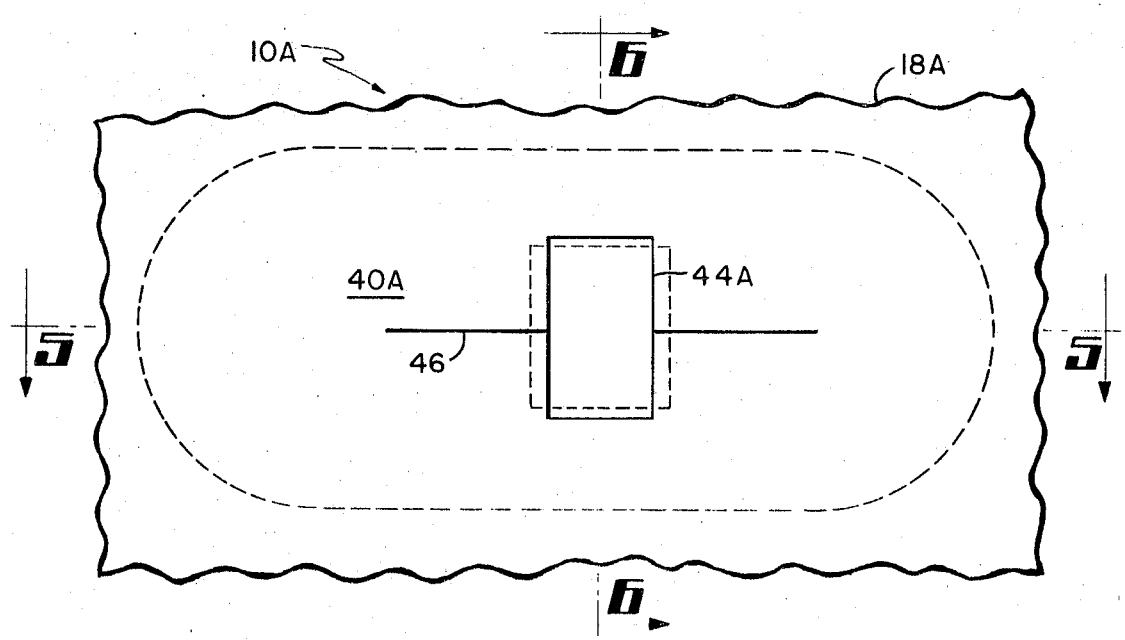
FIG. 4 is a fragmentary top view of another embodiment of this invention in which the warning apparatus is mounted inside the inner tube.
Figure 5:
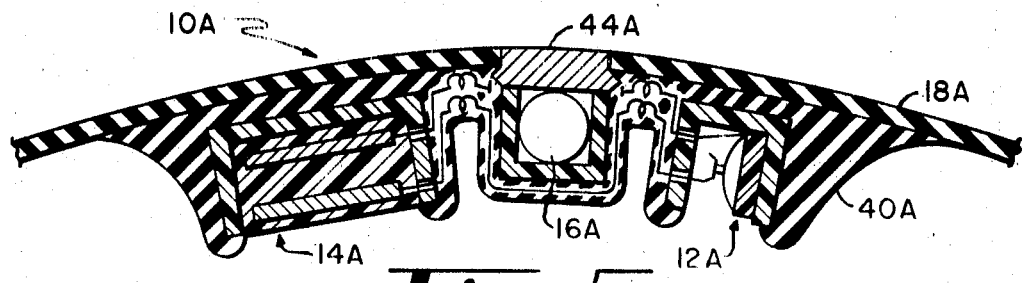
FIG. 5 is a sectional view taken along line 5—5 of FIG. 4.
Figure 6:
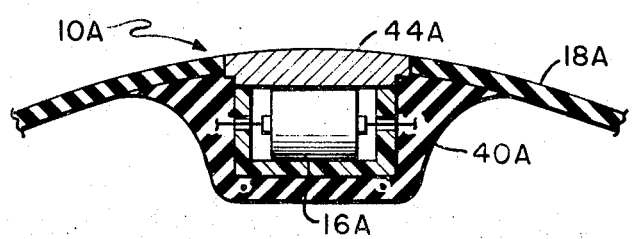
FIG. 6 is a sectional view taken along line 6—6 of FIG. 4.

Another exemplary embodiment of this invention is illustrated in FIGS. 4–6 of the drawings. The tire pressure warning apparatus illustrated in FIGS. 4–6 is very similar to the apparatus 10; therefore, such apparatus will be designated generally by the reference numeral 10A and parts of the apparatus 10A which are very similar to the corresponding parts of the apparatus 10 will be designated by the same reference numeral as the apparatus 10 also followed by the letter designation "A" and not described again. The difference between the embodiment shown in FIGS. 4–6 and the previously described embodiment is in the mounting of the apparatus relative to the inner tube. In the prior embodiment, the apparatus 10 is mounted exteriorly of the inner tube 18. In the present embodiment, the apparatus 10A is mounted to the inside of the inner tube 18A. To accomplish this, a slot 46 is formed in the inner tube 18A through which the semi-flexible unit 10A is inserted. The warning apparatus 10A is again vulcanized or otherwise adhered to the inside of the tube 18A so as to suitably seal the slot 46. The insert 44A permits ready access to the battery through the tube 18A and the elastic material 40A. It is seen in this embodiment that the sensor 12A is in direct communication with the interior of the tube 18A. The elastic material 40A is seen to have areas of reduced thickness between the sensor 12A, battery 16A and transmitter 14A. The reduced thickness portions of the elastic material 40A readily permit flexing of the warning apparatus 10A.

It can be seen that this invention provides a semi-flexible tire pressure warning apparatus used in combination with an inner tube. The individual components of the apparatus are separately housed in hard enclosures remote from each other, the components being entirely encased in an elastic material to permit relative flexing of the apparatus similarly as the tire flexes or is deformed in use. Accordingly, the objectives hereinbefore set forth have been accomplished.

While present exemplary embodiments of this invention have been illustrated and described, it will be recognized that this invention may be otherwise variously embodied and practiced by those skilled in the art.

What is claimed is:

1. A vehicle tire pressure monitoring and warning apparatus adhered to an inner tube of a pneumatic tire for the pressure controlled generation of an RF signal comprising:
   a pressure sensor exposed to the pneumatic pressure within the inner tube;
   a power supply;
   a transmitter including a transmitting antenna;
   said pressure sensor, power supply and transmitter configurated as separate units;
   flexible leads connecting said separate units; and
   a flexible material surrounding each of said separate units, said units configurated to generate a single composite unit and to permit relative flexing of each of said separate units relative to one another, said flexible material being adhered to said inner tube and to conform in shape to the inner surface of the tire.

2. The warning apparatus as set forth in claim 1 in which each of said sensor, power supply and transmitter is mounted in a hard container, each container being held by said flexible material.

3. The warning apparatus as set forth in claim 2 in which said flexible material is secured to the exterior of the inner tube, the inner tube having an aperture therethrough opposite said sensor to provide communication between said sensor and the interior of the inner tube.

4. The warning apparatus as set forth in claim 2 in which the warning apparatus is secured to the interior of the inner tube, said inner tube having an aperture therethrough opposite said power supply to provide access to said power supply; and a removable insert mounted in the inner tube aperture.

* * * * *